Patented July 17, 1923.

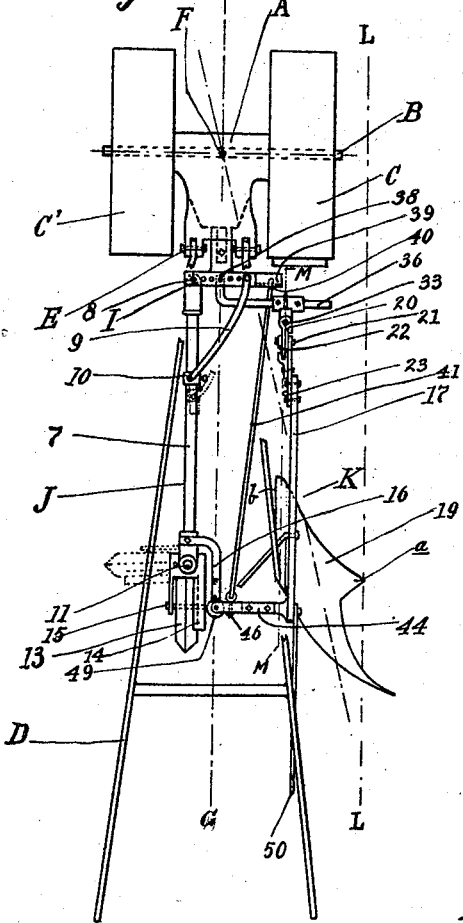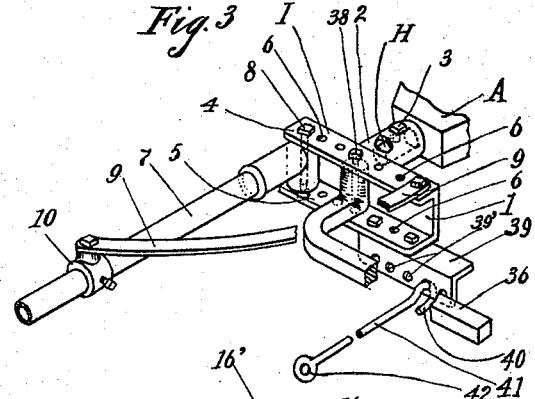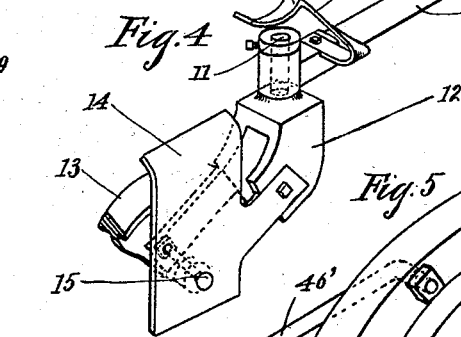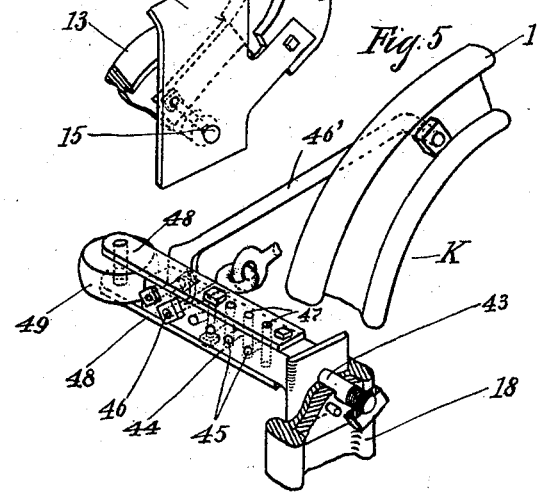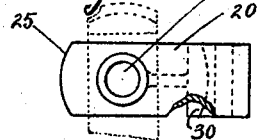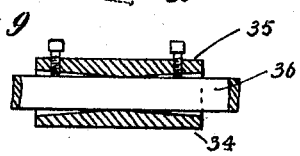

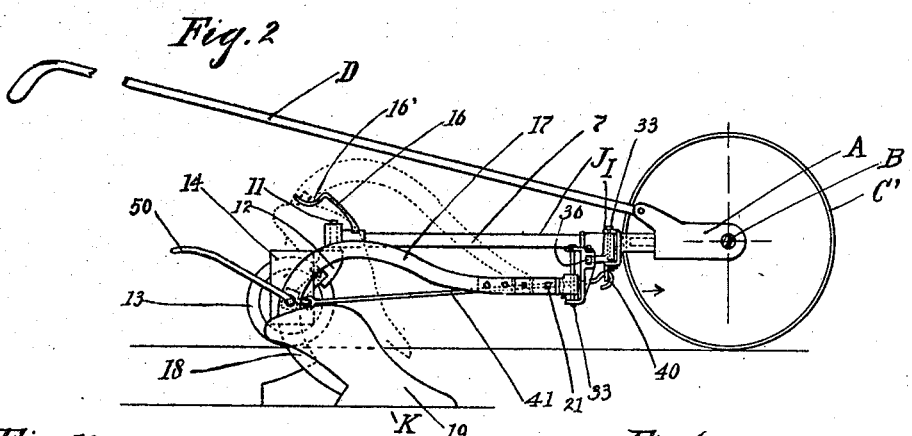
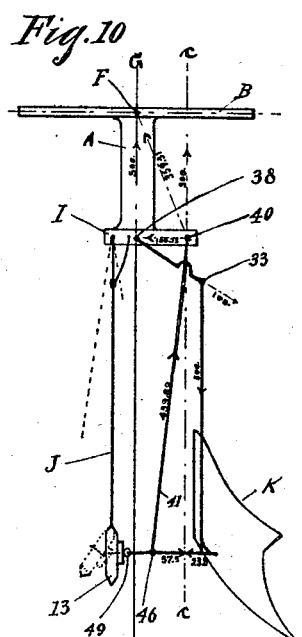
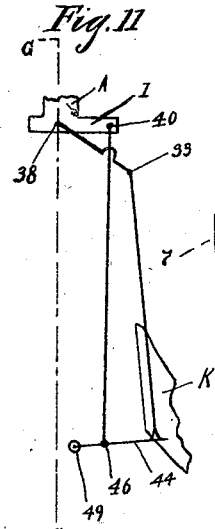
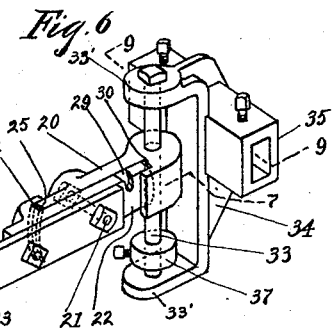
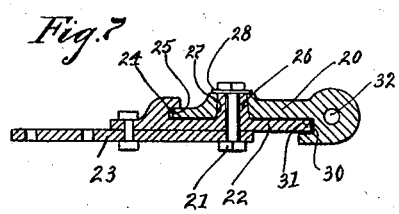

1,462,135

UNITED STATES PATENT OFFICE.

PAUL HANSMANN AND HERMAN STRACK, OF LONG PRAIRIE, MINNESOTA.

ANTISIDE-DRAFT PLOW.

Application filed February 14, 1921. Serial No. 444,949.

*To all whom it may concern:*

Be it known that we, PAUL HANSMANN and HERMAN STRACK, citizens of the United States, residing at Long Prairie, in the county of Todd and State of Minnesota, have invented certain new and useful Improvements in Antiside-Draft Plows, of which the following is a specification.

This invention relates to plow hitches for use in connection with, what are known, as garden tractors, of which the well known Beeman tractor is a type. This tractor, in connection with which our invention is shown, comprises a power unit supported by and operatively connected with a pair of traction wheels, and a rearwardly extending handle, for bodily swinging the traction wheels (in the process of steering) around a pivot point located midway between them.

This two wheel type of tractor, is usually provided with removable trailing casters for stabilizing the body, the operator walking on the ground and directing the tractor after the manner of a lawn mower. As these tractors are of narrow gauge, the body stands at a considerable angle, when one of the traction wheels in running in the furrow, in the process of plowing, resulting in undue side wear of the engine parts, strenuous efforts on the part of the operator in controlling the tractor, and not infrequently in tipping over.

The principal object of our invention is to provide a simple, compact and effective plow hitch, which may be readily attached to the tractor, and whereby the traction wheels are enabled to travel on unplowed ground in the process of plowing, our improved hitch embodying certain novel features of construction whereby the straight forward pull at the draw head is converted into lateral outwardly directed force adapted to be applied to the plow to constantly tend to push the latter away from the center of draft of the tractor for the purpose of eliminating side draft.

A further object of the invention, is the provision of improved plow hitching means whereby the center of draft of the plow may be adjustably held spaced, at such a considerable distance from the center of draft of the tractor, as to plow a furrow partly outside the path of tractor, certain novel features of construction being employed, whereby the force set up by the constant tendency of the plow to travel in a resultant direction toward the center of draft of the tractor (thereby setting up said draft on the land side of the plow) is resisted at a point located immediately adjacent the head and the traction wheels, or in other words, the body of the tractor, said point lying in the axis of the long rearwardly extending steering handle, the body of the engine thus serving as a laterally immovable anchor upon which the long lever constituted by said handle is fulcrumed, so that the operator by manipulating the handle may easily resist the forces concentracted at said point.

A still further object of the invention is to provide, for tractors of the class described, improved plow hitching means, whereby a plow in offset relation with respect to the center of draft of the tractor, will establish a pushing force against the side of the tractor to neutralize its side draft tendencies, and pulling force directed away from the side of the tractor, to in part neutralize said pushing force.

Other objects of the invention will be pointed out as they develop in the course of specification, the invention consisting in the construction, combination and arrangement of parts hereinafter described and claimed.

In the accompanying drawings:

Figure 1 is a semi-diagrammatic top view of a Beeman tractor equipped with the invention, the body and steering handle of the tractor only being shown.

Figure 2 is a side view of same.

Figure 3 is a fragmentary perspective view of the drawhead of our improved plow hitch showing the method of attaching parts of the details.

Figure 4 is a perspective view of the stabilizing caster wheel frame.

Figure 5 is a perspective view of the plow frame extension arm.

Figure 6 is a perspective view of the plow frame connection for connecting the plow with the tractor.

Figure 7 is a sectional view on line 7—7 of Figure 6.

Figure 8 is a top view of the vertically swingable member of the plow frame connection.

Figure 9 is a sectional view on line 9—9 of Figure 8.

Figure 10 is a diagram of the plow hitch shown attached to the tractor, the parts being shown in their normal plowing position, and Figure 11 is a diagram similar to Figure 10 but showing the plow hitch swung outwardly away from the tractor.

In the drawings, A designates the frame of the tractor, B the axle, and C and C' the traction wheels driven by a power unit not shown. D designates the rearwardly extending steering handle having pivotal connection E with the frame, so that it will swing in a vertical plane coincident with the longitudinal axis of the tractor. By moving the outer extremity of the handle laterally the body of the tractor will turn on the central pivot F which is situated at the intersection of the axis of the shaft B and the longitudinal axis or tractor draft line G—G. Projecting rearwardly from the frame A, and coincident with the axis G—G, is the stub shaft 4 of uniform diameter, and adapted to support the usual garden implements, including a plow, ordinarily constituting the outfit to be used in connection with the Beeman type of tractors. Having shown the invention in connection with the Beeman tractor, we have utilized the stub-shaft as a connecting means.

The invention comprises a drawhead I positioned in the tractor draft line, a ground element J, a plow K and lever mechanism extending from the latter to the draw-head.

The drawhead comprises a horizontally disposed channeled head 1, extending transversely of the tractor, the channel thereof facing rearwardly, said head formed with a hub 2, suitably bored to removably fit over the stub shaft H (Fig. 3) said hub having suitable set screw fastening 3 whereby the head may be firmly held positioned. The upper and lower flanges 4 and 5 of the head are provided with spaced bolt holes 6 in vertical register. The ground element J which functions in part as a stabilizer caster for the tractor, comprises a rearwardly extending tongue 7, pivoted to swing in a horizontal plane of the pivot bolt 8 in one of the holes 6 of the drawhead, said tongue being braced by the brace member 9 bolted to the drawhead and having cap screw connection 9' with the sleeve 10, the latter slidable on the tongue 7, and having suitable set screw provision to be firmly positioned. Obviously, by sliding the sleeve along the tongue, the angular position of the latter with respect to the head I may be changed when desired. At its free end, the tongue 7 rotatably supports the vertically disposed shank 11 of the fork 12, which latter rotatably supports the caster wheel 13. The inner side member 14 of the fork 12, is comparatively wide and extends a distance below and above the spindle 15 of the wheel, so as to constitute a shield or pallet presenting a smooth outer surface.

Extending upwardly and rearwardly from the top of the tongue 7, is the plow support 16, formed with a concaved seat 16', the purpose of which will be hereinafter described. The plow K comprises a frame consisting of a beam 17, a sheth portion 18, and the share 19, the beam being constructed at its forward end with a vertically swingable connecting member 20 pivoted on the beam pivot bolt 21, the latter extending through the plates 22 and 23, so as to hold said plates and connecting member positioned flatly against one another, as shown. The plate 22 is formed with an outstanding lug having a groove 24 in its side, said groove being adapted to receive slidably peripherally, the end 25 of the connecting member 20. Centrally, the plate 22 has a centrally bored boss 26, rotatable in the bore 27 of the connecting member 20. A suitable washer 28 overlaps the bore 27, and serves, when the bolt is in position, to keep the connecting member positioned flatly against the plate 22. The inner face 29 of the connecting member extends forwardly to the bottom of the groove 30, the latter being adapted to receive slidably the forward end 31 of the plate 22. Thus, the connecting member 20 may be rotated in the plane parallel with that of the plow frame, the latter being firmly bolted to the plate 23. By rotating the connecting member 20, to a position, at right angles to the plate 22, said member may be slipped off the boss 26, when the bolt is removed, the plate and member being pivotally interlocked, when the respective grooves 24 and 30 engage respectively the ends 25 and 31. Forward of the pivot 21, the connecting member has the vertical bore 32, which latter slidably receives the plow pivot pin 33, whereon the plow may swing laterally, said plow pivot being comparatively long to permit the plow to be adjusted vertically to cut furrows of various depths. The plow pivot pin is mounted in a yoke formed by a pair of vertical aligned lugs 33' extending rearwardly from the housing 34, the housing being formed near the top of the yoke and forward thereof, with a horizontally disposed rectangular comparatively long sleeve 35, slidably receiving, at a point midway between its ends, the tie bar 36. (Fig. 3.) As shown in Figure 9, the top and bottom walls of the interior of the sleeve diverge outwardly from said midway point between its ends, so that the sleeve may rock on the tie bar 36. A pair of set screws, one for each end of the sleeve, as shown, serve to firmly set the sleeve at the desired angle with respect to the tie bar. Thus the plow may be adjusted to cut a level bottom in the furrow. A set screw collar 37, slidable on the plow pin 33 serves to hold the plow at the desired level. By providing the pivot joint 21 in the plow beam 17, instead of pivoting the housing 24, on the tie bar 36, as disclosed in my pending application, Serial No. 423,676, filed November 12, 1920, the plow will, at all times (regardless of the depth of which it may be set) be pulled in a direction aligning with its beam, as indicated by the arrow in Figure 2 of the drawings. In said pending application the level of the pivot 39 remains constant relative to the tractor while in the present invention the pivot 21 remains constant relative to the plow. When the most effective position of the pivot 21 has been ascertained as by trial, the location of the pivot on the plow beam being constant, will always assure the best results.

The tie bar 36, extends laterally to the tractor draft line G—G and then curves to extend forwardly to the row of bolt holes 6 in the drawhead 1. As shown, the tie bar is swingingly connected with the draw head by means of the tie bar pivot pin 38, the bar being formed with a bored hub extening between the flanges 4 of the draw head to lend vertical stability to the bar. Bolted to the lower flange 4 of the draw head, and forming a part thereof, is the extension angle member 39 having a horizontally disposed row of holes 39' in its downwardly extending leg said holes adapted to receive the hook 40 of the draw rod 41, the latter extending rearwardly to a position adjacent the sheth portion of the plow frame and the center of the caster wheel 13, and having an eye 42 at its rear extremity. Firmly secured to the sheth of the plow, as by means of the threaded stud and nut connection 43 extending through and gripping the web thereof, is the outwardly extending extensible arm 44, having a row of spaced horizontally disposed bolt holes 45 directed longitudinally of the tractor. The holes 45 receive the eyebolt 46, the eye thereof being linked with eye 42 of the draw rod. Obviously, the draw rod may be adjusted at its respective ends to engage certain of the holes 39' and 45 to change its angularity relative to the tractor draft line G—G. A strong strut 46' extends from the arm to the beam of the plow.

L—L designates the landside of the adjacent furrow, it being noted that the point a of the plow share 19 is positioned to cut to said line. The center of draft of the plow is designated by the line M—M which latter intersects the pivot 33, and is normally parallel with the tractor draft line.

The arm 44 is also provided with a row of vertically disposed bolt holes in register with the bolt holes 47 in the straps 48, to receive suitable bolts whereby the straps may be firmly bolted to the bar. By means of the spaced holes 47 the bars are rendered adjustable longitudinally of the arm 44, at their outer free ends, the bars rotatably support, on a vertical spindle extending between said ends, the antifriction roller 49, said roller having a rounded periphery, the arm 44 and the caster 13 being so positioned that the roller may be adjusted to engage the shield 14 of the caster fork. Obviously, the roller may be set so as to hold the caster wheel turned out of its normal straight ahead position, as shown in Figure 10, to cause it to travel in a diagonal course directed toward the plow. As is well understood a plow hitched widely off center with respect to the tractor draft line, will tend to travel in a resultant direction as indicated by line x—x, thereby setting up side draft at the landside b of the plow share. A characteristic of two wheel tractors of the type shown, is, that they are easily bodily swung around the pivot A, or, when moving under power, around one of its traction wheels C as a pivot inasmuch as the handle D is quite long, whereby a considerable leverage to turn the body of the tractor is secured. It will be noted that the draw rod 41 is attached at a position close to the body of the tractor allowing slight clearance for the cleats of the traction wheels, so that the pull on the offset draw rod may be easily overcome by the long leverage afforded by the steering handle. The draw rod extends inwardly away from the center of draft of the plow and is shown attached to the arm 44 near the other end thereof. Obviously, in operation the draw rod will tend to assume a position parallel with the center of the draft of the tractor, thereby setting up an outward pressure against a plow frame in opposition to the inward lateral pressure at the landside of the plow. This outward pressure is proportional to the angularity of the draw bar with respect to the tractor draft line. As the side draft may vary with the nature of the soil, the adjustment means for the draw rod described in the foregoing, is provided, whereby the angularity of the latter may be conveniently changed.

Figures 10 and 11 of the drawings, diagrammatically illustrate the lever mechanism employed for hitching the plow to the tractor. The parts swinging on the pivots 38, 40, 33 and 46 permit the plow to be swung laterally, as shown in Figure 11. In the diagrams, said parts extending from pivot to pivot, may be termed lever members pivotally connected, end for end to form a chain, the ends thereof crossing each other and being connected to the draw head 1. Thus, the draw rod lever member 41, may be said to be pivotally connected with an angular lever member formed by the arm 4 and the plow beam 17, said angular lever member being bendable vertically (by means of the pivot 21) adjacent its forward end, and said angular lever member may be said to be pivotally connected with a laterally extending lever member pivotally connected to the draw head.

As the beam of the plow frame and the arm 44 constitute the angular lever member, the plow share may be said to be mounted on said angular member and directed in the direction of travel.

Obviously, when the angular member is pulled forward at the pivot 46, the ground resistance in the plow share 19, will cause said pull to tend to tilt the angular member, to swing its forward pivot end outwardly away from the tractor, thereby establishing a constant outwardly directed force in the pivot 33, during the process of plowing. This force is transferred to the tractor by the lever connecting the pivots 33 and 38.

Thus, the longitudinal pull in the draw rod is converted into a lateral pull tending to pull the tractor toward the plow, it being noted that the outwardly directed force applied to the plow at pivot 46 as stated in the foregoing, is concentrated in the pivot 40, and tends to force the latter away from the plow. As the pivot is situated close to the tractor body, the weight of the latter operates, in part, as a laterally resisting ground element, while the long handle affords ample leverage to resist a turning movement of the tractor.

In Figure 10 a close approximate of the magnitudes of the several forces are given, the same having been ascertained by the graphical method of resolving forces, it having been assumed, that a five hundred pound pull existed in the line c—c, which latter is parallel with the tractor draft line G—G. The arrow heads indicate the direction of the forces, it being noted that the 57½ pound force at pivot 46 is opposed by a 23.8 pound force in the angular lever member, leaving a net outwardly directed force of 33.7 pounds. At the point 33, a diagonally directed force of 100 pounds tends to resist a leftward turning movement of the tractor around its pivot A. A 500 pound pull at A, develops a 100.75 pound force in the draw head tending to turn the tractor to the left said force being opposed to the 100 pounds at the pivot 33. As the load is offset to the lines c—c, there would not be a 500 pound pull at A, thereby materially reducing the 100.75 pound, which is largely neutralized by the force at the pivot 33.

As the ground element J is hitched in offset relation, in opposition to the plow, it serves also to reduce the forces tending to turn the tractor toward the furrow. When it is found desirable, under unusual conditions to further resist side draft tendencies in the plow, the caster 13 may be set, to constantly engage the roller 49, at which time the caster constitutes a ground element. As shown in dotted lines (Fig. 2) the plow may be swung bodily upwardly about its pivot 33, to bring the arm 44 to rest on the seat 16' of the plow support 16, for which purpose the lifting handle 50 is provided.

I claim:

1. A plow hitch for use in connection with tractors comprising, a draw head adapted to be attached to the rear of the tractor, a plow having a jointed beam bendable upwardly, said plow positioned at one side of the center of draft of the tractor a distance at the rear of said draw head, a part of the plow above the rear portion of the plow share extending outwardly toward the center of draft of the tractor, a draw rod pivotally connected to said draw head and to said outwardly extending part of the plow, said draw rod extending diagonally rearwardly toward the center of draft of the tractor, and a tie rod pivotally connected to said plow beam and draw head and extending across said draw rod.

2. A plow hitch for use in connection with tractors comprising a draw head adapted to be attached to the rear of the tractor an angular lever member extending outwardly from a position adjacent the center of draft of the tractor and forwardly to a position adjacent said draw head, a plow share rigidly supported on the rear portion of said angular lever member, the land side of the plow share being spaced a distance from the center of draft of the tractor and arranged in parallelism therewith, a tie bar having pivotal connection with said draw head so as to swing in a horizontal plane and extending outwardly to said angular lever member and having pivotal connection therewith, means in connection with said angular lever member forward of the plow share, whereby to render said angular member swingable upwardly, and a draw rod pivotally connected with said outwardly extending part of said angular lever member and extending forwardly and outwardly across said tie bar to said draw head and having pivotal connection therewith.

3. A plow hitch, comprising in part a draw head, a plow positioned in operative position in offset relation with respect to the center of draft of the draw head, mechanism for pulling said plow in a straight ahead direction, pivotally connected to said draw head and operatively connected with said plow, said mechanism being constructed so as to apply a force tending to bodily rotate said plow in a horizontal plane concurrently with the straight ahead pulling movement, and means connected to the plow and draw head for transmitting said applied force to the latter in a direction opposed to said straight ahead pulling movement.

4. In a plow hitch, the combination with a tractor and a plow positioned in offset relation with respect to the center of draft of the tractor, of mechanism pivotally connected to the tractor for pulling the plow at such a position relative to the center of draft of the tractor as to tend to rotate the latter bodily in a direction away from the plow, said mechanism being pivotally connected to the plow at such a position as to apply a force tending to rotate the plow in a horizontal plane in a direction away from the tractor; and means connecting the plow and tractor to oppose both of said rotating tendencies.

5. In a plow hitch, the combination with a draw-head carried by a tractor; of a plow in operative position in offset relation with respect to the center of draft of the tractor, said plow constructed with a forwardly extending frame which latter includes a sheth portion, a connecting member extending between the draw head and said sheth portion and having pivotal connection with both, the pivotal connections of said connecting member being located in vertical longitudinally disposed planes situated between the landside of the plow and the center of draft of the tractor, and connecting means extending from the draw head to the forward portion of the plow frame, said means including a vertical pivotal connection with the draw head which connection is located between the center of draft of the tractor and the forward pivotal connection of said connecting member, and a vertical pivotal connection with the forward portion of the plow frame, which latter connection is located in a vertical longitudinal plane situated outside of the landside of the plow.

6. In a plow hitch, the combination with a draw head carried by a tractor, a plow positioned in operative position in offset relation with respect to the center of draft of the tractor, mechanism for pulling said plow in a straight ahead direction, pivotally connected to said draw head and operatively connected with said plow, said mechanism being constructed so as to apply a force tending to bodily rotate said plow in a horizontal plane concurrently with the straight ahead movement, means in connection with the plow and draw head for opposing said tendency of rotating the tractor, and a caster wheel having vertical swivel mounting and supported on the draw head so as to run adjacent to the plow laterally opposite the share thereof, and having a part behind its swivel adapted to engage with the plow to be steered thereby responsive to a landward movement of the plow out of a straight course.

In testimony whereof we affix our signatures.

PAUL HANSMANN.
HERMAN STRACK.